(12) United States Patent
Yoo et al.

(10) Patent No.: US 8,605,821 B2
(45) Date of Patent: Dec. 10, 2013

(54) APPARATUS AND METHOD FOR SCRAMBLING IN A WIRELESS COMMUNICATION SYSTEM

(75) Inventors: Kyung-Chul Yoo, Gwacheon-si (KR); Bo-Rham Lee, Seoul (KR); Yun-Ju Kwon, Suwon-si (KR); Dong-Min Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 13/061,331

(22) PCT Filed: Sep. 3, 2009

(86) PCT No.: PCT/KR2009/004977
§ 371 (c)(1),
(2), (4) Date: Feb. 28, 2011

(87) PCT Pub. No.: WO2010/027198
PCT Pub. Date: Mar. 11, 2010

(65) Prior Publication Data
US 2011/0150134 A1   Jun. 23, 2011

(30) Foreign Application Priority Data

Sep. 4, 2008  (KR) .................. 10-2008-0087073

(51) Int. Cl.
*H04L 27/36* (2006.01)

(52) U.S. Cl.
USPC ........... 375/298; 375/295; 375/308; 375/265; 713/150

(58) Field of Classification Search
USPC .......... 370/210; 375/260, 265, 295, 298, 308; 713/150, 151
See application file for complete search history.

(56) References Cited

U.S. PATENT DOCUMENTS

| | | | |
|---|---|---|---|
| 2002/0159501 A1* | 10/2002 | Agami et al. | 375/130 |
| 2008/0123760 A1 | 5/2008 | Oh et al. | |
| 2008/0215655 A1 | 9/2008 | Negre et al. | |
| 2011/0096866 A1* | 4/2011 | Qu | 375/295 |

* cited by examiner

*Primary Examiner* — Leon-Viet Nguyen
(74) *Attorney, Agent, or Firm* — Jefferson IP Law, LLP

(57) ABSTRACT

An apparatus and method for scrambling in a wireless communication system are provided. The apparatus includes a selector, a plurality of scramblers, and a plurality of modulators. The selector selects a scrambling scheme to be applied to a transmission bit stream according to a modulation scheme to be applied to the transmission bit stream. The plurality of scramblers scramble the transmission bit stream according to a scrambling scheme corresponding to each of a plurality of modulation schemes. The plurality of modulators modulate the scrambled transmission bit stream according to the plurality of modulation schemes.

18 Claims, 6 Drawing Sheets

APPARATUS AND METHOD FOR SCRAMBLING IN A WIRELESS COMMUNICATION SYSTEM

TECHNICAL FIELD

The present invention relates to a wireless communication system. More particularly, the present invention relates to an apparatus and method for scrambling in a wireless communication system.

BACKGROUND ART

In a wireless communication system, an information bit stream forwarded from a transmit end to a receive end is converted into symbols through encoding and modulation, is converted into a signal of a Radio Frequency (RF) band according to a physical layer standard of a system, and then is transmitted. At this time, the information bit stream is divided into a size of a constant unit, and is Cyclic Redundancy Check (CRC) processed. The CRC processing is a procedure for determining the occurrence or non-occurrence of a transmission error by performing a polynomial operation using a predefined CRC code in the transmit end and the receive end. If transmission bits are all equal to '0', a result of CRC processing of the receive end is equal to '0'. However, even if bits all of which are not equal to '0' are transmitted but all are not received due to channel deterioration, a result of CRC processing of the receive end is equal to '0'. That is, although all the transmission bits are lost due to the channel deterioration, the receive end erroneously determines that there is no transmission error.

Accordingly, in order to detect a case in which transmission bits are all equal to '0', the transmit end and the receive end perform scrambling and descrambling. In general, the scrambling is performed through a scrambler that is comprised of a shift register. After that, a scrambled bit stream is converted into symbols. At this time, number of bits necessary to generate one symbol is varied depending on a modulation scheme. For example, a Binary Phase Shift Keying (BPSK) scheme needs one bit per symbol, a Quadrature Phase Shift Keying (QPSK) scheme needs two bits per symbol, and a 16Quadrature Amplitude Modulation (16QAM) scheme needs four bits per symbol.

However, the scrambler has an input of a bit unit and an output of a bit unit. That is, bits of length 'N' number are input in sequence, and scrambled bits of length 'N' number are output in sequence. Thus, a high order modulation scheme of more than a QPSK scheme requires buffering bits of number necessary to generate each symbol. And, the buffering causes an increase of a processing time consumed to transmit a transmission bit stream.

As described above, because of the bit-unit input/output of the scrambler, a modulation scheme of mapping a plurality of bits per symbol requires buffering. Further, as a modulation order increases, a processing time consumed due to the buffering increases. Because of this, it is required to decrease a time consumed for a different operation or increase an operation clock of the scrambler in order to meet with a signal processing time required by a system. Thus, there is a need for an alternative for reducing the processing time consumed due to the buffering.

DISCLOSURE OF INVENTION

Solution to Problem

An aspect of the present invention is to substantially address at least the above problems and/or disadvantages and to provide at least the advantages below. Accordingly, one aspect of the present invention is to provide an apparatus and method for reducing a processing time consumed due to buffering for symbol generation after scrambling in a wireless communication system.

Another aspect of the present invention is to provide an apparatus and method for applying a different scrambling scheme depending on a modulation scheme in a broadband wireless communication system.

A further another aspect of the present invention is to provide an apparatus and method for controlling an input/output unit of scrambling depending on a modulation scheme in a broadband wireless communication system.

The above aspects are achieved by providing an apparatus and method for scrambling in a wireless communication system.

According to one aspect of the present invention, a transmit end apparatus in a wireless communication system is provided. The apparatus includes a selector, a plurality of scramblers, and a plurality of modulators. The selector selects a scrambling scheme to be applied to a transmission bit stream according to a modulation scheme to be applied to the transmission bit stream. The plurality of scramblers scramble the transmission bit stream according to a scrambling scheme corresponding to each of a plurality of modulation schemes. The plurality of modulators modulate the scrambled transmission bit stream according to the plurality of modulation schemes.

According to another aspect of the present invention, an operation method of a transmit end in a wireless communication system is provided. The method selecting a scrambling scheme to be applied to a transmission bit stream according to a modulation scheme to be applied to the transmission bit stream, scrambling the transmission bit stream according to the selected scrambling scheme, and modulating the scrambled transmission bit stream according to the modulation scheme.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other objects, features and advantages of the present invention will become more apparent from the following detailed description when taken in conjunction with the accompanying drawings in which.

BEST MODE FOR CARRYING OUT THE INVENTION

Figure 1:
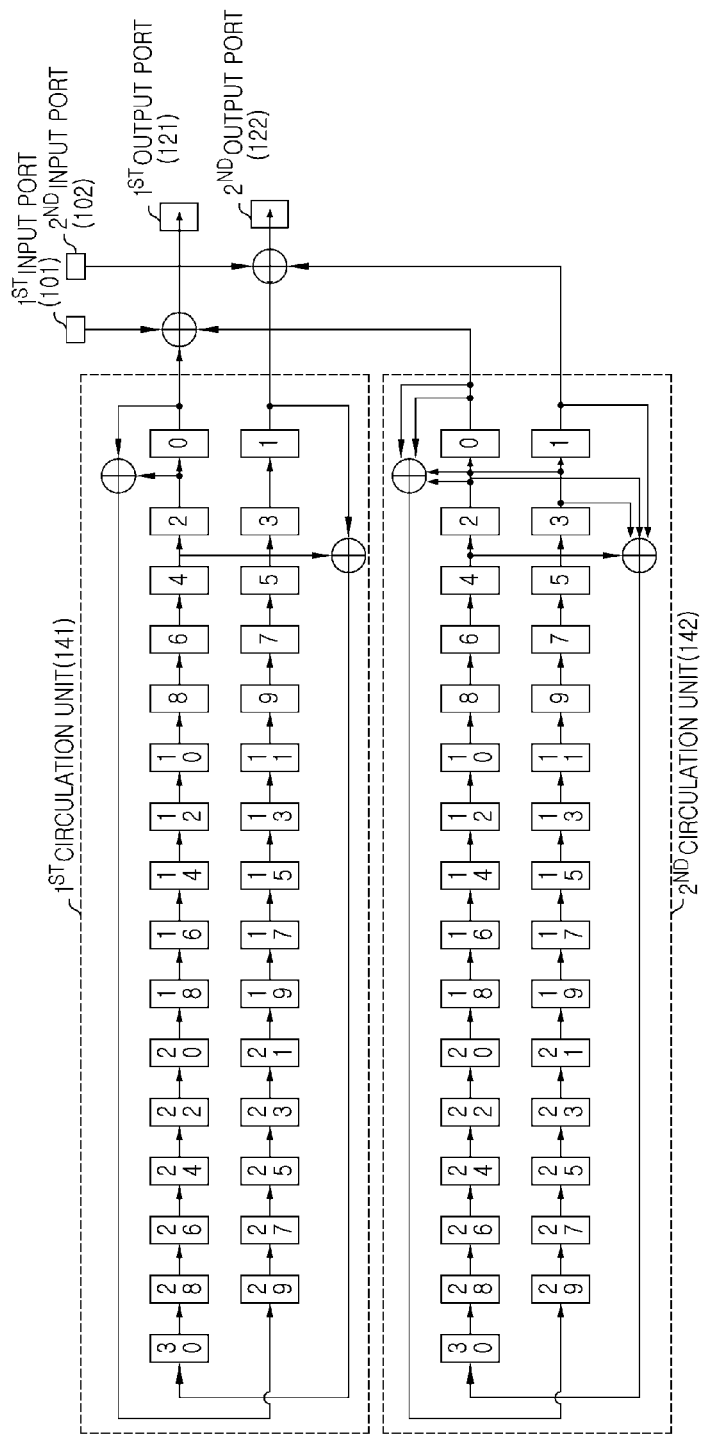
FIG. 1 is a diagram illustrating an example of a construction of a scrambler for a Quadrature Phase Shift Keying (QPSK) scheme in a wireless communication system according to the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technique for reducing a processing time consumed due to buffering an output of a scrambler in a wireless communication system according to the present invention is described below. Below, the present invention describes a wireless communication system of an Orthogonal Frequency Division Multiplexing (OFDM)/Orthogonal Frequency Division Multiple Access (OFDMA) scheme, for example, and is identically applicable even to a wireless communication system of a different scheme.

To reduce a buffering time for symbol generation, a transmit end according to an exemplary embodiment of the present invention determines a modulation order before scrambling, and performs scrambling using a scrambler corresponding to the modulation order. That is, the transmit end according to an exemplary embodiment of the present invention includes a plurality of scramblers, and each of the plurality of scramblers is designed to be optimized to each modulation order. In other words, each of the plurality of scramblers processes bits of which number is necessary to generate one symbol based on a corresponding modulation order, as one unit. For example, a scrambler for a Quadrature Phase Shift Keying (QPSK) scheme simultaneously inputs two bits and simultaneously outputs two bits.

Figure 3:
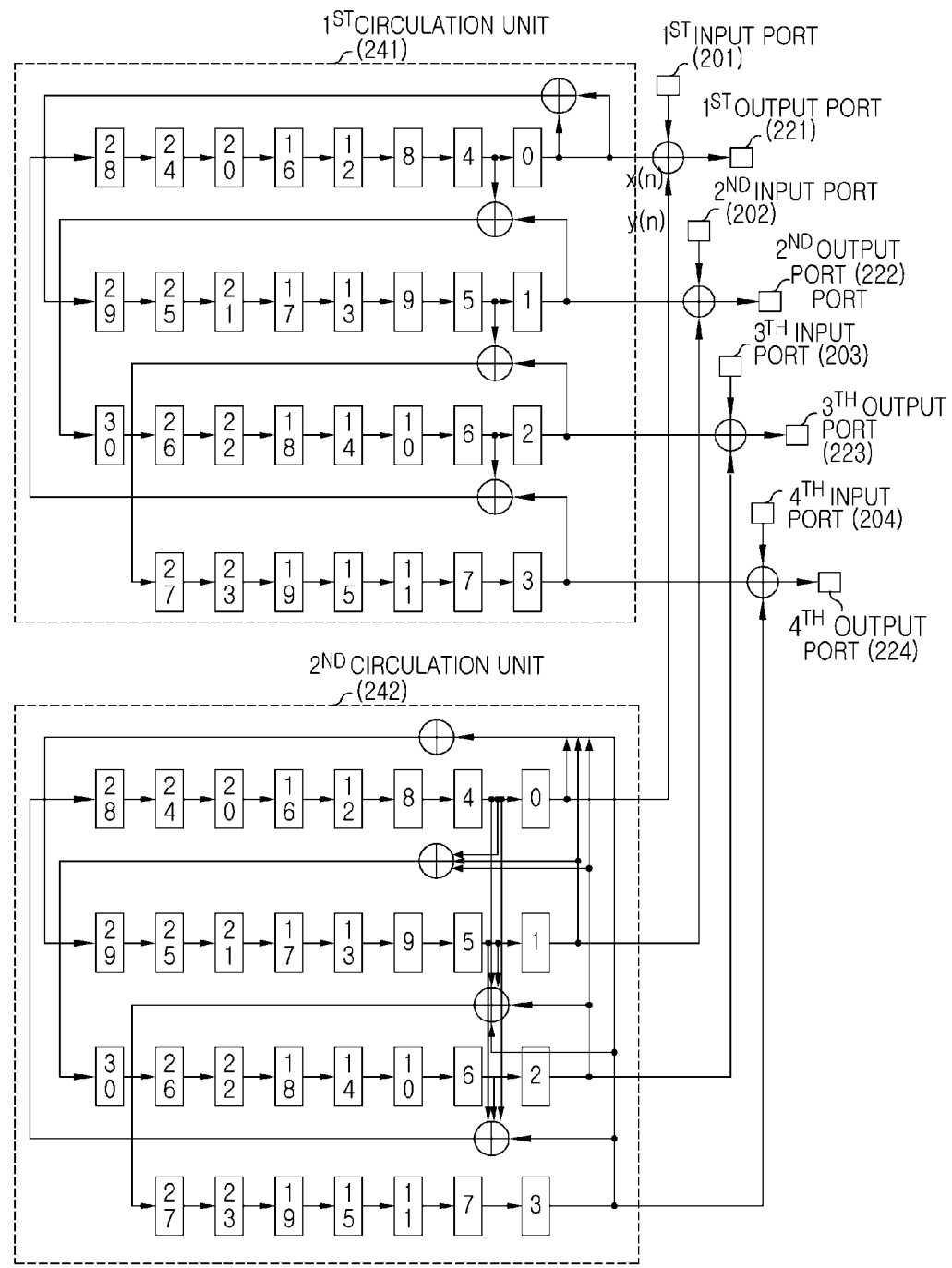
FIG. 3 is a diagram illustrating an example of a construction of a scrambler for a 16 Quadrature Amplitude Modulation (16QAM) scheme in a wireless communication system according to the present invention.

FIGS. 1 and 3 illustrate detailed examples of constructions of a scrambler for a QPSK scheme and a scrambler for a 16 Quadrature Amplitude Modulation (16QAM) scheme.

Referring to FIG. 1, the scrambler for the QPSK scheme has two input ports and two output ports. Even-numbered bits are input through a first input port 101, and odd-numbered bits are input through a second input port 102. And, two bits are output through a first output port 121 and a second output port 122. The two bits simultaneously output through the first output port 121 and the second output port 122 are used to generate one QPSK symbol. Also, the scrambler for the QPSK scheme includes a first circulation unit 141 and a second circulation unit 142. The first circulation unit 141 includes thirty one registers for circulating a bit stream X(n) and two eXclusive OR (XOR) operators. The second circulation unit 142 includes thirty one registers for circulating a bit stream Y(n) and two XOR operators. Here, an initial value of the X(n) may be '1000 . . . 000$_{(31)}$', and an initial value of the Y(n) may be a predefined scrambling sequence.

The thirty one registers included in each of the first and second circulation units 141 and 142 form two register streams. Outputs of each register stream are XORed with input bits of the scrambler. A result of XOR operation is equal to an output of the scrambler. That is, one output bit is generated by XORing an output of one register stream of the first circulation unit 141, an output of one register stream of the second circulation unit 142, and one input bit. And, an output of the last register of each register stream is XORed with an output of at least one different register and then, is input to a first register of a different register stream.

In detail, a first register stream within the first circulation unit 141 is arranged in a sequence of #30, #28, #26, #24, #22, #20, #18, #16, #14, #12, #10, #8, #6, #4, #2, and #0 registers. A second register stream within the first circulation unit 141 is arranged in a sequence of #29, #27, #25, #23, #21, #19, #17, #15, #13, #11, #9, #7, #5, #3, and #1 registers. Here, an output of the #0 register is equal to an output of the first register stream within the first circulation unit 141, and an output of the #1 register is equal to an output of the second register stream within the first circulation unit 141.

As illustrated in FIG. 1, during one cycle, a result of XOR operation between an output of the #0 register and an output of the #2 register is provided as an input of the #29 register, and a result of XOR operation between an output of the #1 register and an output of the #4 register is provided as an input of the #30 register.

Figure 2:
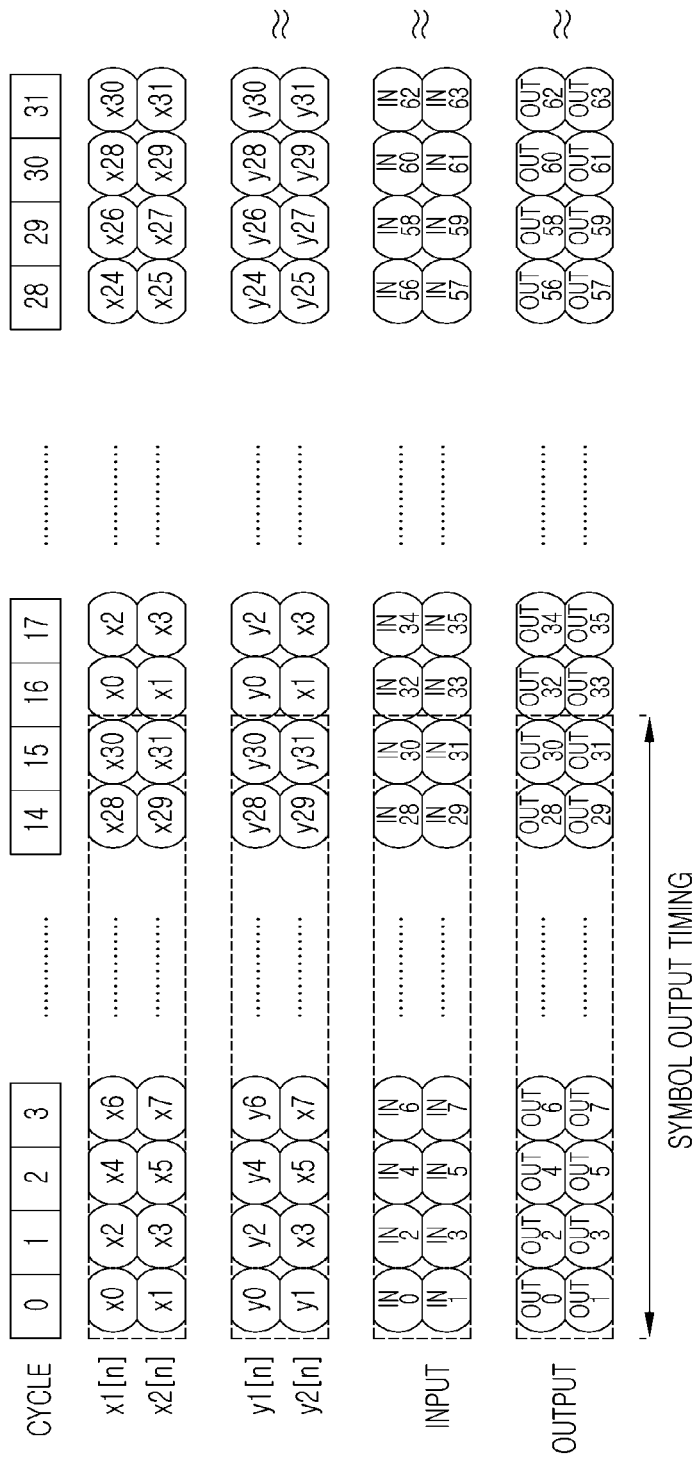
FIG. 2 is a diagram illustrating an output timing of a scrambler for a QPSK scheme in a wireless communication system according to the present invention.

The scrambler of a construction of FIG. 1 has a symbol output timing illustrated in FIG. 2. As illustrated in FIG. 2, thirty two information bits are processed during 16 cycles without buffering delay, and thus, bits necessary to generate sixteen QPSK symbols are provided during the 16 cycles. By doing so, one QPSK symbol per one cycle can be generated.

Referring to FIG. 3, a scrambler for a 16QAM scheme has four input ports and four output ports. $4n^{-th}$ bits are input through a first input port 201, $(4n+1)^{-th}$ bits are input through a second input port 202, $(4n+2)^{-th}$ bits are input through a third input port 203, and $(4n+3)^{-th}$ bits are input through a fourth input port 204. And, four bits are output through a first output port 221, a second output port 222, a third output port 223, and a fourth output port 224. The four bits simultaneously output through the first output port 221 to the fourth output port 224 are used to generate one 16QAM symbol. Also, the scrambler for the 16QAM scheme includes a first circulation unit 241 and a second circulation unit 242. The first circulation unit 241 includes thirty one registers for circulating a bit stream X(n) and four XOR operators. The second circulation unit 242 includes thirty one registers for circulating a bit stream Y(n) and four XOR operators. Here, an initial value of the X(n) may be '1000 . . . 000$_{(31)}$', and an initial value of the Y(n) may be a predefined scrambling sequence.

The thirty one registers included in each of the first and second circulation units 241 and 242 form four register streams. Outputs of each register stream are XORed with input bits of the scrambler. A result of XOR operation is equal to an output of the scrambler. That is, one output bit is generated by XORing an output of one register stream of the first circulation unit 241, an output of one register stream of the second circulation unit 242, and one input bit. And, an output of the last register of each register stream is XORed with an output of at least one different register and then, is input to a first register of a different register stream.

In detail, a first register stream within the first circulation unit 241 is arranged in a sequence of #28, #24, #20, #16, #12, #8, #4, and #0 registers. A second register stream within the first circulation unit 241 is arranged in a sequence of #29, #25, #21, #17, #13, #9, #5, and #1 registers. A third register stream within the first circulation unit 141 is arranged in a sequence of #30, #26, #22, #18, #14, #10, #6, and #2 registers. A fourth register stream within the first circulation unit 141 is arranged in a sequence of #27, #23, #19, #15, #11, #7, and #3 registers. Here, an output of the #0 register is equal to an output of the first register stream within the first circulation unit 241, an output of the #1 register is equal to an output of the second register stream within the first circulation unit 241, an output of the #2 register is equal to an output of the third register stream within the first circulation unit 241, and an output of the #3 register is equal to an output of the fourth register stream within the first circulation unit 241.

As illustrated in FIG. 3, during one cycle, a result of XOR operation between an output of the #0 register and an output of the #0 register is provided as an input of the #29 register, a result of XOR operation between an output of the #1 register and an output of the #4 register is provided as an input of the #30 register, a result of XOR operation between an output of the #2 register and an output of the #5 register is provided as an input of the #27 register, and a result of XOR operation between an output of the #3 register and an output of the #6 register is provided as an input of the #28 register.

Figure 4:
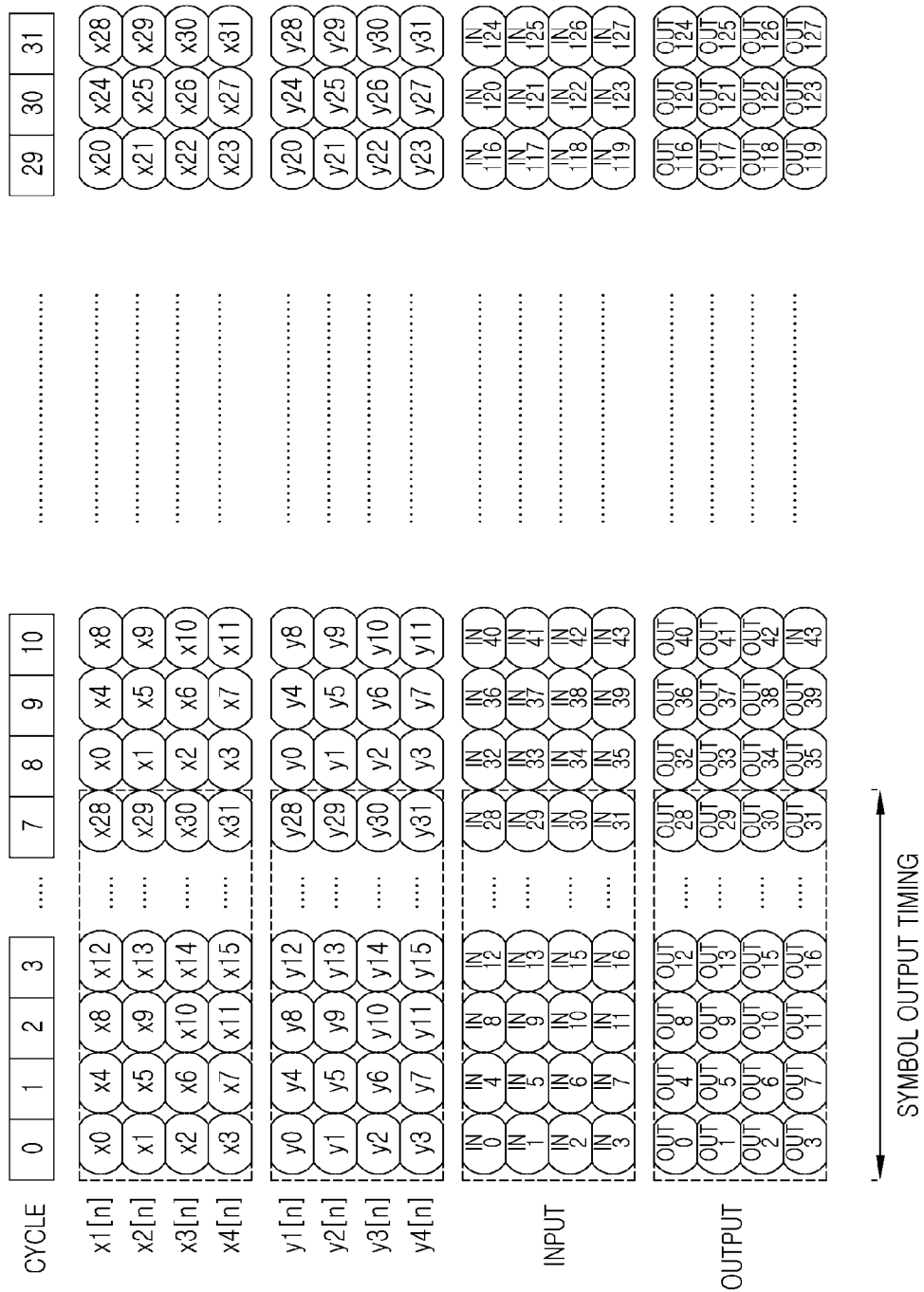
FIG. 4 is a diagram illustrating an output timing of a scrambler for a 16QAM scheme in a wireless communication system according to the present invention.

The scrambler of a construction of FIG. 3 has a symbol output timing illustrated in FIG. 4. As illustrated in FIG. 4, thirty two information bits are processed during 8 cycles without buffering delay and thus, bits necessary to generate eight 16QAM symbols are provided during the 8 cycles. By doing so, one 16QAM symbol per one cycle can be generated.

Figure 5:
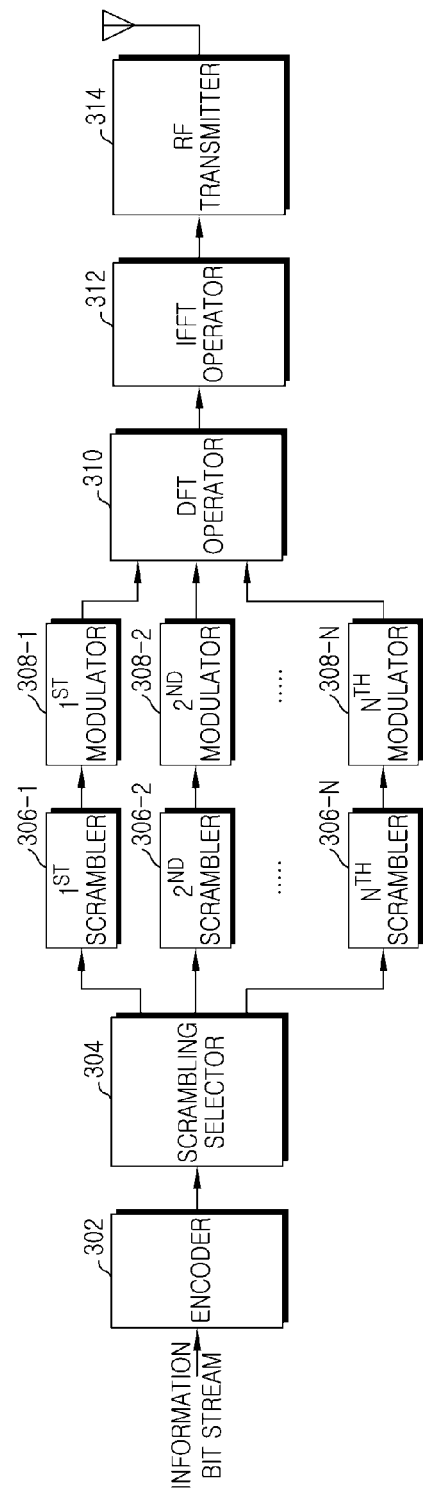
FIG. 5 is a block diagram illustrating a construction of a transmit end in a wireless communication system according to an exemplary embodiment of the present invention.

FIG. 5 illustrates a construction of a transmit end in a wireless communication system according to an exemplary embodiment of the present invention.

As illustrated in FIG. 5, the transmit end includes an encoder 302, a scrambling selector 304, a plurality of scramblers 306-1 to 306-N, a plurality of modulators 308-1 to 308-N, a Discrete Fourier Transform (DFT) operator 310, an Inverse Fast Fourier Transform (IFFT) operator 312, and an RF transmitter 314.

The encoder 302 encodes an information bit stream to be transmitted. For example, the encoder 302 performs encoding according to a Low Density Parity Code (LDPC) technique, a turbo coding technique, etc. The scrambling selector 304 selects a scrambling scheme to be applied to a transmission bit stream according to a modulation scheme to be applied to the transmission bit stream, and provides the encoded bit stream provided from the encoder 302 to the scrambler 306 that follows the selected scrambling scheme. At this time, the scrambling selector 304 provides bits of number necessary to generate a symbol of a modulation scheme corresponding to the selected scrambling scheme, as one unit.

Each of the plurality of scramblers 306-1 to 306-N scrambles a bit stream according to a scrambling scheme corresponding to each of modulation schemes of the plurality of modulators 308-1 to 308-N. That is, each of the plurality of scramblers 306-1 to 306-N uses bits of number necessary to generate one symbol of a corresponding modulation scheme, as an input/output unit. For example, if the first scrambler 306-1 corresponds to a QPSK scheme, the first scrambler 306-1 uses two bits as an input/output unit, thus inputting two bits and outputting two bits during one cycle. At this time, the plurality of scramblers 306-1 to 306-N perform scrambling using a predefined scrambling sequence. For example, part of the plurality of scramblers 306-1 to 306-N is constructed as in FIGS. 1 and 3.

The plurality of modulators 308-1 to 308-N modulate a scrambled bit stream according to a different modulation scheme. At this time, each of the plurality of modulators 308-1 to 308-N simultaneously receives bits of number necessary to generate a symbol from a corresponding scrambler 306. That is, the plurality of modulators 308-1 to 308-N generate symbols without buffering of a bit.

The DFT operator 310 converts the symbols into frequency domain values through DFT operation for the sake of signal processing at a frequency axis. The IFFT operator 312 maps the frequency domain values to a frequency domain and then, converts the frequency domain values to a time domain signal through IFFT operation. The RF transmitter 314 up-converts a signal provided from the IFFT operator 312 into an RF band signal and then, transmits the RF band signal through an antenna.

As illustrated in FIG. 5, the transmit end includes the DFT operator 310. The DFT operator 310 is included if the transmit end is a Mobile Station (MS). The DFT operator 310 is a constituent element for signal processing at a frequency axis for multiple access among a plurality of MSs. Thus, if the transmit end is a Base Station (BS), the DFT operator 310 may not be included.

Figure 6:
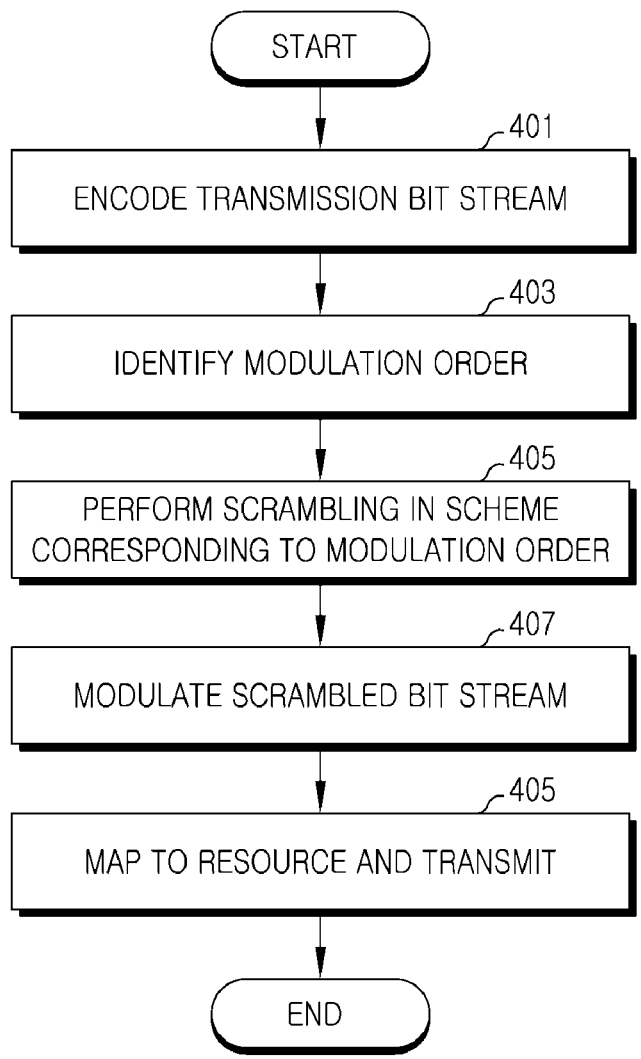
FIG. 6 is a flow diagram illustrating an operation procedure of a transmit end in a wireless communication system according to an exemplary embodiment of the present invention.

FIG. 6 illustrates an operation procedure of a transmit end in a wireless communication system according to an exemplary embodiment of the present invention.

Referring to FIG. 6, in step 401, the transmit end encodes a transmission bit stream. For example, the transmit end performs encoding according to an LDPC technique, a turbo coding technique, etc.

After performing the encoding, the transmit end proceeds to step 403 and identifies a modulation order of a modulation scheme to be applied to the encoded bit stream. The modulation scheme is decided by a channel quality with a receive end, an available resource amount, etc. The modulation scheme is decided before execution of the procedure illustrated in FIG. 6.

After identifying the modulation order, the transmit end proceeds to step 405 and scrambles the encoded bit stream in a scrambling scheme corresponding to the identified modulation order. That is, the transmit end performs scrambling using bits of number necessary to generate one symbol of the modulation scheme as an input/output unit. At this time, the transmit end performs scrambling using a predefined scrambling sequence.

After performing the scrambling, the transmit end proceeds to step 407 and modulates the scrambled bit stream. That is, the transmit end converts the scrambled bit stream into symbols according to a predefined modulation scheme. At this time, the scrambling is performed for bits of number necessary to generate one symbol as an input/output unit and thus, the receive end generates one symbol every one cycle without buffering of a bit.

After modulating the scrambled bit stream, the transmit end proceeds to step 409 and maps the symbols to a resource, transmitting the mapped symbols. For example, if the transmit end is an MS, the transmit end converts the symbols into frequency domain values through DFT operation and then, converts the frequency domain values into a time domain signal through IFFT operation. And, the transmit end up-converts the time domain signal into an RF band signal and then, transmits the RF band signal through an antenna. On the other hand, if the transmit end is a BS, the transmit end maps the symbols to a subcarrier and then, converts the symbols mapped to the subcarrier into a time domain signal through IFFT operation. And, the transmit end up-converts the time domain signal into an RF band signal and transmits the RF band signal through the antenna.

By changing an input/output unit of scrambling according to a modulation scheme in a wireless communication system, a buffering time for symbol generation is reduced and, due to this, a processing time of a transmit end is reduced. Further, according to the present invention, as an order of a modulation scheme increases, an effect of reducing a buffering time increases.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. An apparatus for a transmit end in a wireless communication system, the apparatus comprising:
    a selector for selecting a scrambling scheme to be applied to a transmission bit stream according to a modulation scheme to be applied to the transmission bit stream;
    a plurality of scramblers for scrambling the transmission bit stream according to a scrambling scheme corresponding to each of a plurality of modulation schemes; and
    a plurality of modulators for modulating the scrambled transmission bit stream according to the plurality of modulation schemes,
    wherein the plurality of scramblers comprise a different number of output ports and a different number of register streams per a circulation unit, and
    wherein the number of output ports and the number of the register streams per a circulation unit are identical to a number of bits which is necessary to generate one complex symbol according to a corresponding modulation scheme.

2. The apparatus of claim 1,
    wherein the plurality of scramblers comprise a first scrambler for a Quadrature Phase Shift Keying (QPSK) modulation scheme having two input ports and two output ports, and
    wherein the first scrambler comprises:
        a first circulation unit comprising thirty one registers for circulating a bit stream X(n) and two eXclusive OR (XOR) operators; and
        a second circulation unit comprising thirty one registers for circulating a bit stream Y(n) and two XOR operators, and
    wherein an initial value of the X(n) comprises '1000000000000000000000000000000', and an initial value of the Y(n) comprises a predefined scrambling sequence.

3. The apparatus of claim 2, wherein the thirty one registers comprised in each of the first circulation unit and the second circulation unit constitute two register streams,
    wherein, during one cycle, a value of XOR operation of an output of a first register stream within the first circulation unit, an output of a first register stream within the second circulation unit, and a first input bit is output as a first output bit, and
    wherein, during the one cycle, a value of XOR operation of an output of a second register stream within the first circulation unit, an output of a second register stream within the second circulation unit, and a second input bit is output as a second output bit.

4. The apparatus of claim 3, wherein the first register stream within the first circulation unit is arranged in a sequence of #30, #28, #26, #24, #22, #20, #18, #16, #14, #12, #10, #8, #6, #4, #2, and #0 registers,
    wherein the second register stream within the first circulation unit is arranged in a sequence of #29, #27, #25, #23, #21, #19, #17, #15, #13, #11, #9, #7, #5, #3, and #1 registers, and
    wherein an output of the #0 register is equal to an output of the first register stream within the first circulation unit, and an output of the #1 register is equal to an output of the second register stream within the first circulation unit.

5. The apparatus of claim 4, wherein, during the one cycle, a result of XOR operation between an output of the #0 register and an output of the #2 register is provided as an input of the #29 register, and
    wherein, during the one cycle, a result of XOR operation between an output of the #1 register and an output of the #4 register is provided as an input of the #30 register.

6. The apparatus of claim 1, wherein the plurality of scramblers comprise a second scrambler for a 16QAM modulation scheme having four input ports and four output ports, and
    wherein the second scrambler comprises:
        a first circulation unit comprising thirty one registers for circulating a bit stream X(n) and four XOR operators; and
        a second circulation unit comprising thirty one registers for circulating a bit stream Y(n) and four XOR operators, and
    wherein an initial value of the X(n) comprises '1000000000000000000000000000000', and an initial value of the Y(n) comprises a predefined scrambling sequence.

7. The apparatus of claim 6, wherein the thirty one registers comprised in each of the first circulation unit and the second circulation unit constitute four register streams,
    wherein, during one cycle, a value of XOR operation of an output of a first register stream within the first circulation unit, an output of a first register stream within the second circulation unit, and a first input bit is output as a first output bit,
    wherein, during the one cycle, a value of XOR operation of an output of a second register stream within the first circulation unit, an output of a second register stream within the second circulation unit, and a second input bit is output as a second output bit,
    wherein, during the one cycle, a value of XOR operation of an output of a third register stream within the first circulation unit, an output of a third register stream within the second circulation unit, and a third input bit is output as a third output bit, and
    wherein, during the one cycle, a value of XOR operation of an output of a fourth register stream within the first circulation unit, an output of a fourth register stream within the second circulation unit, and a fourth input bit is output as a fourth output bit.

8. The apparatus of claim 7, wherein the first register stream within the first circulation unit is arranged in a sequence of #28, #24, #20, #16, #12, #8, #4, and #0 registers, the second register stream within the first circulation unit is arranged in a sequence of #29, #25, #21, #17, #13, #9, #5, and #1 registers, the third register stream within the first circulation unit is arranged in a sequence of #30, #26, #22, #18, #14, #10, #6, and #2 registers, and the fourth register stream within the first circulation unit is arranged in a sequence of #27, #23, #19, #15, #11, #7, and #3 registers, and wherein an output of the #0 register is equal to an output of the first register stream within the first circulation unit, an output of the #1 register is equal to an output of the second register stream within the first circulation unit, an output of the #2 register is equal to an output of the third register stream within the first circulation unit, and an output of the #3 register is equal to an output of the fourth register stream within the first circulation unit.

9. The apparatus of claim 8, wherein, during the one cycle, a result of XOR operation between an output of the #0 register and an output of the #0 register is provided as an input of the #29 register, wherein, during the one cycle, a result of XOR operation between an output of the #1 register and an output of the #4 register is provided as an input of the #30 register, wherein, during the one cycle, a result of XOR operation between an output of the #2 register and an output of the #5 register is provided as an input of the #27 register, and wherein, during the one cycle, a result of XOR operation between an output of the #3 register and an output of the #6 register is provided as an input of the #28 register.

10. An operation method of a transmit end in a wireless communication system, the method comprising:

selecting a scrambling scheme to be applied to a transmission bit stream according to a modulation scheme to be applied to the transmission bit stream;

scrambling, by one of scramblers, the transmission bit stream according to the selected scrambling scheme; and modulating the scrambled transmission bit stream according to the modulation scheme, wherein the scramblers comprise a different number of output ports and a different number of register streams per a circulation unit, and wherein the number of output ports and the number of the register streams per a circulation unit are identical to a number of bits which is necessary to generate one complex symbol according to a corresponding modulation scheme.

11. The method of claim 10, wherein the scrambling is performed by a first scrambler for a Quadrature Phase Shift Keying (QPSK) modulation scheme having two input ports and two output ports, and wherein the first scrambler comprises:

a first circulation unit comprising thirty one registers for circulating a bit stream X(n) and two eXclusive OR (XOR) operators; and a second circulation unit comprising thirty one registers for circulating a bit stream Y(n) and two XOR operators, and wherein an initial value of the X(n) comprises '1000000000000000000000000000000', and an initial value of the Y(n) comprises a predefined scrambling sequence.

12. The method of claim 11, wherein the thirty one registers comprised in each of the first circulation unit and the second circulation unit constitute two register streams, wherein, during one cycle, a value of XOR operation of an output of a first register stream within the first circulation unit, an output of a first register stream within the second circulation unit, and a first input bit is output as a first output bit, and wherein, during the one cycle, a value of XOR operation of an output of a second register stream within the first circulation unit, an output of a second register stream within the second circulation unit, and a second input bit is output as a second output bit.

13. The method of claim 12, wherein the first register stream within the first circulation unit is arranged in a sequence of #30, #28, #26, #24, #22, #20, #18, #16, #14, #12, #10, #8, #6, #4, #2, and #0 registers, wherein the second register stream within the first circulation unit is arranged in a sequence of #29, #27, #25, #23, #21, #19, #17, #15, #13, #11, #9, #7, #5, #3, and #1 registers, and wherein an output of the #0 register is equal to an output of the first register stream within the first circulation unit, and an output of the #1 register is equal to an output of the second register stream within the first circulation unit.

14. The method of claim 13, wherein, during the one cycle, a result of XOR operation between an output of the #0 register and an output of the #2 register is provided as an input of the #29 register, and wherein, during the one cycle, a result of XOR operation between an output of the #1 register and an output of the #4 register is provided as an input of the #30 register.

15. The method of claim 10, wherein the scrambling is performed by a second scrambler for a 16QAM modulation scheme having four input ports and four output ports, and wherein the second scrambler comprises:

a first circulation unit comprising thirty one registers for circulating a bit stream X(n) and four XOR operators; and a second circulation unit comprising thirty one registers for circulating a bit stream Y(n) and four XOR operators, and wherein an initial value of the X(n) comprises '1000000000000000000000000000000', and an initial value of the Y(n) comprises a predefined scrambling sequence.

16. The method of claim 15, wherein the thirty one registers comprised in each of the first circulation unit and the second circulation unit constitute four register streams, wherein, during one cycle, a value of XOR operation of an output of a first register stream within the first circulation unit, an output of a first register stream within the second circulation unit, and a first input bit is output as a first output bit, wherein, during the one cycle, a value of XOR operation of an output of a second register stream within the first circulation unit, an output of a second register stream within the second circulation unit, and a second input bit is output as a second output bit, wherein, during the one cycle, a value of XOR operation of an output of a third register stream within the first circulation unit, an output of a third register stream within the second circulation unit, and a third input bit is output as a third output bit, and wherein, during the one cycle, a value of XOR operation of an output of a fourth register stream within the first circulation unit, an output of a fourth register stream within the second circulation unit, and a fourth input bit is output as a fourth output bit.

17. The method of claim 16, wherein the first register stream within the first circulation unit is arranged in a sequence of #28, #24, #20, #16, #12, #8, #4, and #0 registers, the second register stream within the first circulation unit is arranged in a sequence of #29, #25, #21, #17, #13, #9, #5, and #1 registers, the third register stream within the first circulation unit is arranged in a sequence of #30, #26, #22, #18, #14, #10, #6, and #2 registers, and the fourth register stream within the first circulation unit is arranged in a sequence of #27, #23, #19, #15, #11, #7, and #3 registers, and wherein an output of the #0 register is equal to an output of the first register stream within the first circulation unit, an output of the #1 register is equal to an output of the second register stream within the first circulation unit, an output of the #2 register is equal to an output of the third register stream within the first circulation unit, and an output of the #3 register is equal to an output of the fourth register stream within the first circulation unit.

18. The method of claim 17, wherein, during the one cycle, a result of XOR operation between an output of the #0 register and an output of the #0 register is provided as an input of the #29 register, wherein, during the one cycle, a result of XOR operation between an output of the #1 register and an output of the #4 register is provided as an input of the #30 register, wherein, during the one cycle, a result of XOR operation between an output of the #2 register and an output of the #5 register is provided as an input of the #27 register, and wherein, during the one cycle, a result of XOR operation between an output of the #3 register and an output of the #6 register is provided as an input of the #28 register.

\* \* \* \* \*